(No Model.)
E. WILDER.
SELF IRRIGATING FLOWER POT OR VASE.
No. 267,296.                     Patented Nov. 7, 1882.
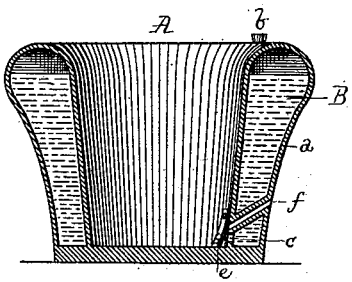
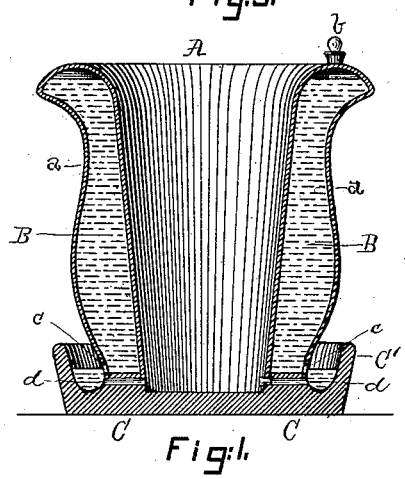
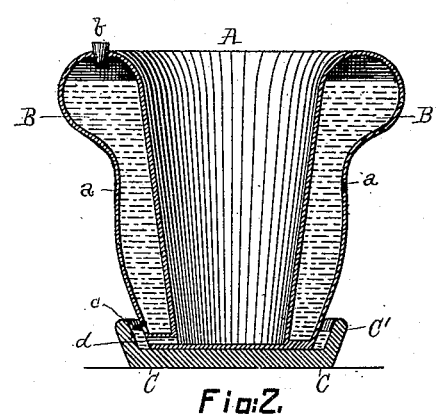
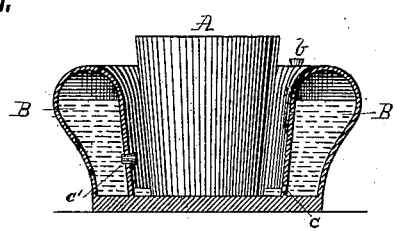
Witnesses.
E. C. Perkins
John F. Wilder
Inventor,
Elihu Wilder,
By Charles B. Tilden
Attorney

UNITED STATES PATENT OFFICE.

ELIHU WILDER, OF MANCHESTER, NEW HAMPSHIRE.

SELF-IRRIGATING FLOWER POT OR VASE.

SPECIFICATION forming part of Letters Patent No. 267,296, dated November 7, 1882.

Application filed February 23, 1881. (No model.)

*To all whom it may concern:*

Be it known that I, ELIHU WILDER, of Manchester, in the county of Hillsborough and State of New Hampshire, have invented certain new and useful Improvements in Self-Irrigating Flower Pots or Vases, of which the following is a specification.

Referring to the drawings forming a part of this application, Figure 1 is a central vertical section of my invention. Fig. 2 is a similar section showing a modified construction. Fig. 3 is a similar section showing a modification of the device illustrated in Fig. 2. Fig. 4 is a similar section showing a modification of the form illustrated in Fig. 1. Fig. 5 is a view, partly in section and partly in elevation, illustrating a form for an ornamental stand for a chamber or parlor, intended to hold several pots.

My invention relates to pots or other vessels for containing the earth in which plants are propagated, or vessels holding cut flowers; and it consists in a novel construction and combination of parts, whereby the soil or flowers contained in said vessels are automatically supplied with the proper degree of moisture from a reservoir forming a part of or connected with the said pot, the water being suspended in said reservoir by atmospheric pressure.

A in the drawings indicates a flower pot or vase of any suitable size, shape, or proportions, and constructed from any suitable material, such as clay, china, glass, metal, or paper-pulp. Within the vertical wall $a$, I form a cistern or reservoir, B, having an opening, $b$, at the top, closed by a plug or similar device, and one or more apertures, $c$, at the bottom, which form a communication between the interior of the cistern and the exterior. The pot or vessel A in Figs. 1 and 2 is provided with a saucer or stand, C, which in its general form resembles the saucer used with the flower-pots, (to catch the water escaping from the earth,) having a flange, C', which surrounds the lower end of the pot, leaving a space between the pot and the flange for the reception of the water. In my invention this saucer or stand C may be either made separate, so as to be detachable from the pot or vase, or it may be cast or molded or otherwise attached thereto, so as to form a permanent portion of the structure. The apertures $c$, leading from the cistern, open directly into the saucer C. Below the plane of said apertures I form one or more channels, $d$, which lead from the interior of the pot to the lowest point, or nearly so, within the saucer. It will be noted, also, that the other end of said channel or channels opens within said pot very near the floor or bottom.

The principle upon which this device operates is as follows: By closing the aperture $c$ the reservoir B may be filled to the top through the opening $b$, which should then be tightly corked. Upon opening the said apertures $c$ water will flow from the cistern B into the saucer C, thence into the pot A through the channels $d$, until the plane of the escaped fluid rises above the apertures $c$. The moment this point is reached no more air can enter the cistern to take the place of the escaping water, and the outflow will therefore cease, the column of water in the cistern being sustained by the pressure of the atmosphere on the water in the saucer. As evaporation takes place, or as the water which enters the vessel is absorbed by the earth, a further descent or outflow will take place to a sufficient degree to retain the water at the same height in the saucer. It is evident that at whatever point it stands in the latter it must be at a corresponding point within the interior of the pot.

As a modification in construction, it will be noticed that in Fig. 2 I have shown the pot and the saucer made separately, so that one is detachable from the other. In all other respects the construction is identically the same. Again, the reservoir may be made wholly separate and distinct, as shown in Figs. 3 and 5. In Fig. 3 the arrangement resembles an ordinary flower-pot set within a pot made in accordance with my invention. The pot A in said figure may be provided simply with a single opening in its bottom, through which the water escaping from the reservoir B will easily enter; or by using unglazed ware for the pot A and making it of coarse clay the water will readily percolate through the pores of the walls, although in less quantity than it would enter through an opening. For those classes of plants which can bear only a small percentage of moisture this form of my invention will be especially valuable. In such cases a second opening, c', may be made at a higher point than the aperture c, whereby the water may be caused to rise and partly surround the pot. When not needed this opening may be readily plugged.

In Fig. 4 I show a form in which the saucer C may be wholly dispensed with. In this case the escape-openings are made in the interior walls of the pot or vase, and lead thereto from the cistern direct. A gate, e, is hung in front of said opening to prevent it becoming choked with dirt, and an opening or inclined channel, f, may be formed in the wall to allow the ready escape of the air, which might, if the earth became caked or hard, find an obstructed outlet.

In the form of construction seen in Fig. 5 I again show the reservoir made wholly separate from the pot. This pattern of my device I intend for use in a parlor, or upon a fancy flower-stand, or in a show-window for the exhibition of different flowers, arranged in different forms to contain a number of pots or vases. Although any of the other forms which I show may be used in the same manner, it will be seen that there is a special convenience in having a single reservoir supply a number of pots or vases, and, besides the economy of space thus secured, I am able to provide a more tasteful and beautiful appearance. In this modification, B is the reservoir, formed in such a manner that it furnishes a seat for a large pot, thereby concealing the aperture b, through which it is filled with water. At the bottom or lower end of said reservoir is a suitable number of channels, d', which radiate from the reservoir as a center to a corresponding number of saucers, C, arranged at intervals around the reservoir. The lower portion of this structure may be cast or formed in a single piece, as shown in the drawings, the upper portion of the reservoir being necessarily formed separately and the two parts bolted together, as shown. The pots used with this stand may be of the usual pattern, with a single aperture in the bottom, or they may be provided with one or more small openings, f' f'', formed in the side or vertical wall of the pot.

Many other changes in form and construction will readily suggest themselves to any person skilled in the art. The same general principle, however, holds good throughout the whole, and the principle of operation is not altered.

The value and importance of my invention may readily be estimated. In the case of valuable and rare plants, nothing is more common than for the plant to be injured or destroyed by too small a supply of water. On the other hand, a numerous variety of plants require a restricted quantity, and perish if they are given more. In my invention the quantity supplied is uniformly the same, and the amount actually absorbed by the soil may be in every instance graduated very closely. For those who are obliged to be absent periodically, and who do not care to hire an attendant, my invention will prove invaluable. As a matter of convenience alone, however, its superior cleanliness and the saving of time and labor which it involves are enough to insure its value. The same invention may be employed to feed the flowers arranged in wreaths and crosses, which are so commonly deposited upon graves and elsewhere in cemeteries. Even where cut flowers are arranged in these forms my feeding-reservoir may be employed to replenish the form in which the flowers are arranged, and thereby supply the loss by evaporation.

In cases where the pot and the saucer are made separate the volume of water supplied to the former may be regulated by simply raising the pot and placing a support underneath.

Having thus described my invention, what I claim as new, and desire to secure by Letters Patent, is—

1. As a new article of manufacture, a flower-pot provided with a water-reservoir which is connected with or forms part of said pot, the two communicating with each other by means of channels which enter both reservoir and pot at or near the bottom part only, said reservoir being hermetically closed at all other points, whereby the water contained therein is by atmospheric pressure suspended above the escape-openings and at a higher level than the escaped portion in the bottom of the pot, the supply from said reservoir being regulated by the evaporation or absorption of said liquid, substantially as and for the purpose set forth.

2. A reservoir containing water and provided with discharge-openings at its lowest point only, in combination with one or more pot-stands of dish shape, arranged substantially upon the same level with the discharge-openings, and into which said openings empty, and a pot occupying said stand and adapted to be supplied with moisture from the water flowing into it from the reservoir, the water within the latter being suspended above the discharge-openings by atmospheric pressure, substantially as and for the purpose set forth.

In testimony whereof I have signed my name to this specification in the presence of two subscribing witnesses.

ELIHU WILDER.

Witnesses:
E. C. PERKINS,
CHAS. B. TILDEN.